T. E. CANN.
REPAIR OR REINFORCEMENT OF PNEUMATIC TIRES.
APPLICATION FILED JUNE 9, 1910.

1,047,166.

Patented Dec. 17, 1912.

Witnesses:-

Inventor.
Thomas E. Cann
by Connolly Bros. Attys

UNITED STATES PATENT OFFICE.

THOMAS EDWIN CANN, OF LEICESTER, ENGLAND.

REPAIR OR REINFORCEMENT OF PNEUMATIC TIRES.

1,047,166.  Specification of Letters Patent.  Patented Dec. 17, 1912.

Application filed June 9, 1910. Serial No. 565,985.

*To all whom it may concern:*

Be it known that I, THOMAS EDWIN CANN, a subject of the King of Great Britain, residing at Leicester, in the county of Leicester, England, have invented certain new and useful Improvements Relating to the Repair or Reinforcement of Pneumatic Tires, of which the following is a specification.

The jackets or outer covers of pneumatic tires, particularly such as are used on motor cars, perish at the rib or bead which fits into the groove of the wheel rim and holds the tire on the latter. This perishing takes place from a variety of causes, such as the rotting of the canvas fabric due to wet getting into contact therewith when the wheels are being washed as well as during inclement weather or bad state of the roads. This perishing invariably renders the tire or cover un-repairable by the manufacturer according to the methods of repair at present in vogue, while it often happens that a tire in this condition is comparatively good and capable of considerable wear on the tread surface.

The present invention has for its object to repair or reinforce tires which are damaged in the direction indicated, so as to impart to them a new lease of life and fit them for considerable further wear.

The method of reinforcing jackets or outer covers according to this invention consists in applying thereto a durable non-stretchable material, passing around and fitting snugly over and to the rib or bead and sewing it tightly thereover. A convenient material for the purpose consists of chrome tanned cowhide combined with which canvas is employed, the said materials being molded to the shape and section of the tire cover so as to fit closely thereto. The reinforcement is sewn to the cover with a wax thread or waterproof cord and if desirable the line of stitches may be covered with a waterproof coating.

The invention will be more fully described with reference to the accompanying drawing, wherein:—

Figure 1:
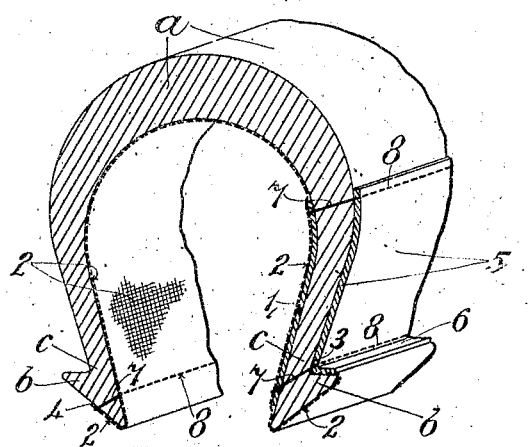
Figure 2:
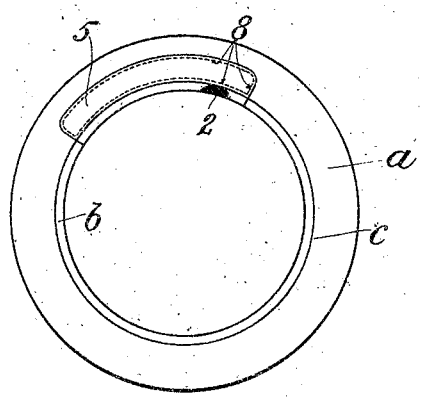

Figure 1 is a perspective view showing a transverse section of a jacket or outer cover which is repaired or reinforced in accordance with this invention. Fig. 2 is a side view of the complete outer cover furnished with a reinforcing device according to this invention. Fig. 2 is drawn to a smaller scale than Fig. 1.

Referring to the drawing $a$ is the ordinary tire or cover and $b$ are the ribs or beads which fit into the groove of the wheel rim to hold the tire on the latter.

The perishing of a tire usually takes place by rotting or otherwise through the walls of the tire at $c$ near the ribs or beads $b$ the latter frequently breaking away as a result and thus rendering the tire or cover useless. According to the present invention this portion of a tire or cover is repaired or reinforced in a manner which consists of an internal and external application of a durable non-stretchable material. The preferred method is to employ a combination of chrome tanned cowhide and canvas as will now be described with reference to Fig. 1. To the inside of the tire or cover $a$ is applied a piece of leather 1 molded or shaped to fit closely to said cover. A piece of canvas 2 (represented in section by a dotted line) also preferably molded to fit the arch of the cover is then applied and extends from the point 3 around the rib or bead $b$ on one side of the cover, over the leather 1, around the interior arch and lower edge to a point 4 on the opposite side of the cover. A piece of leather 5 molded at 6 to fit closely up to the rib or bead $b$ is applied to the outside of the tire and over the end 3 of the canvas 2. The parts described are then secured by means of wax thread or waterproof cord sewn right through the tire or cover $a$ at the points indicated at 7. The lines of stitches 8 may be covered with a waterproof coating such as india-rubber or cement to fill the stitch holes and protect the stitches.

The foregoing detailed description describes the repairing or reinforcing of one side only of the tire or cover but if both sides are to be repaired or reinforced it will be obvious that each side will be treated in the manner just referred to and as shown on the right hand side of Fig. 1. The said repairing or reinforcing device may extend a convenient distance up the side of the cover as shown in Figs. 1 and 2 and may be applied or molded in sections, as sometimes it is only a certain portion of the cover which requires renewal as shown in Fig. 2. If the whole of the tire had to be reinforced, the ends of the sections would be joined to those of their neighbors all around the tire.

It is found convenient to make the holes for the stitches with a shoemaker's awl from one side of the cover and as this is being withdrawn to follow it with a saddler's needie (or equivalent) containing the thread. It is necessary to adopt a method of this character, as if the awl is first withdrawn, the hole in the india-rubber closes, so that the thread cannot pass through, but as the awl is being withdrawn the end of the needle is kept in contact therewith and the two articles (awl and needle) being of metal it is easy to feel them in contact as the one follows the other.

What I claim then is:—

1. The process of repairing or reinforcing pneumatic tires which consists in applying to the interior of the tire a strip of leather molded to fit the tire, then applying on the inner and outer surfaces and around the bead, a reinforcement of durable, non-stretchable, material and securing the same to the tire by two lines of stitching, one at the outer edge of the reinforcing strip and the other adjacent the bead.

2. The method of repairing or reinforcing pneumatic tires which consists in applying to the interior of the tire a strip of leather molded to fit the tire, then applying a strip of canvas over said leather strip, around the bead of the tire, and above the same on the outer side, then applying to the outer side of the tire, above the bead and over the canvas, another molded leather strip, and securing the reinforcing strips to the tire and together by two lines of stitching, one at the outer edge of the reinforcing strips and the other adjacent the bead, substantially as described.

In testimony whereof I affix my signature, in presence of two witnesses.

TOM CANN.

Witnesses:
R. W. C. TAYLOR,
GEORGE LESTER.